United States Patent
Park

(10) Patent No.: US 7,843,790 B2
(45) Date of Patent: Nov. 30, 2010

(54) APPARATUS AND METHOD FOR PLAYING OPTICAL DISC

(75) Inventor: Byung Gwon Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1157 days.

(21) Appl. No.: 11/494,531

(22) Filed: Jul. 28, 2006

(65) Prior Publication Data

US 2007/0201337 A1   Aug. 30, 2007

(30) Foreign Application Priority Data

Feb. 24, 2006   (KR) ...................... 10-2006-0018129

(51) Int. Cl.
G11B 7/20 (2006.01)
(52) U.S. Cl. ....................................... 369/94
(58) Field of Classification Search ................. None
See application file for complete search history.

(56) References Cited

U.S. PATENT DOCUMENTS

| 7,423,955 | B2 * | 9/2008 | Tieke et al. .............. 369/275.3 |
| 2002/0186637 | A1 | 12/2002 | Van Woudenberg et al. |
| 2005/0044309 | A1 * | 2/2005 | Motohashi ................. 711/112 |

FOREIGN PATENT DOCUMENTS

| JP | 9-138950 | 5/1997 |
| JP | 10-198972 | 7/1998 |
| JP | 2002-190123 | 7/2002 |
| JP | 2004-335029 | 11/2004 |
| JP | 2004-362726 | 12/2004 |
| JP | 2005-63589 | 3/2005 |
| JP | 2005-158260 | 6/2005 |

OTHER PUBLICATIONS

Office Action issued in Japanese Patent Application No. 2006-236096 on Feb. 24, 2009.
Office Action issued in corresponding Japanese Patent Application No. 2006-236096 dated Jun. 16, 2009.

* cited by examiner

*Primary Examiner*—Wayne R Young
*Assistant Examiner*—Aneeta Yodichkas
(74) *Attorney, Agent, or Firm*—Stanzione & Kim, LLP

(57) ABSTRACT

Apparatus and method for playing an optical disc, whereby the apparatus includes an optical disc drive to read data of the disc, in which the data on a previous layer and a subsequent layer is read in an OTP manner. The optical disc drive includes a pick-up module, and a microcomputer to control the pick-up module such that, when a start sector of the subsequent layer is located outward from a last sector of the previous layer, the pick-up module is moved to a position corresponding to the start sector of the subsequent layer after completing the reading of the data of the previous layer, and is made to perform a layer jump to the position corresponding to the start sector of the subsequent layer. The apparatus can minimize time delay in the layer jump, and shorten a period of time for the layer jump by shortening a traveling distance of the pick-up module, enabling smooth and continuous reproduction of data.

38 Claims, 6 Drawing Sheets (A)　　　　　　　　　　(B)

APPARATUS AND METHOD FOR PLAYING OPTICAL DISC

CROSS-REFERENCE TO RELATED APPLICATIONS

This application claims the benefit of Korean Application No. 2006-18129, filed Feb. 24, 2006 in the Korean Intellectual Property Office, the disclosure of which is incorporated herein by reference.

BACKGROUND OF THE INVENTION

1. Field of the Invention

Aspects of the present invention relate to an apparatus and method for playing an optical disc, and, more particularly, to an apparatus and method for playing a multiple-layer optical disc, which can control movement of a pick-up module relative to the respective layers when reproducing data recorded on the optical disc.

2. Description of the Related Art

Optical discs, such as compact discs (CD), digital versatile discs, blue-ray discs (BD), high definition DVDs (HD-DVD) etc., are widely used for storing a large amount of data, and have a thin disc shape. The optical disc comprises a layer for recording the data, which has a reflective plane to allow video data, sound data, and text data to be recorded on the layer via combination of pits formed on the reflective plane of the layer.

Such an optical disc can be classified into a single layer optical disc which has a single layer formed therein, and a multiple-layer optical disc which has two or more layers formed therein. The multiple-layer optical disc comprises two or more layers overlapped with each other on a single optical disc to enlarge the recording capability of the optical disc. Currently, a dual layer optical disc comprising two layers is very widely used as one of the multiple-layer optical discs, and can be classified into a single-side dual layer optical disc and a double-side dual layer optical disc. In the single-side dual layer optical disc, both layers have reflective planes oriented in one direction, and a laser is irradiated only to one side of the optical disc. On the other hand, in the double-side dual layer optical disc, the reflective planes of the respective layers are oriented in different directions from each other, and a laser is irradiated to both sides of the optical disc.

When playing the multiple-layer optical disc, a layer jump must be performed for continuous reading of data in such a way that a pick-up module is moved relative to another layer immediately after reading data recorded on one of the layers.

Accordingly, when smoothly reproducing the data, in particular, video data or sound data, it is necessary to allow the layer jump to be rapidly performed while preventing reproduction of the video data or sound data from being cut off upon the layer jump.

SUMMARY OF THE INVENTION

Accordingly, an aspect of the present invention includes an apparatus and method for playing a multiple-layer optical disc, which can minimize time delay caused by a layer jump during play of the multiple-layer optical disc, and can shorten a period of time for the layer jump of a pick-up module by shortening a traveling distance of the pick-up module, enabling smooth and continuous reproduction of data.

Additional aspects and/or advantages of the invention will be set forth in part in the description which follows and, in part, will be apparent from the description, or may be learned by practice of the invention.

The foregoing and/or other aspects of the present invention are achieved by providing an apparatus for playing a multiple-layer optical disc, comprising an optical disc drive to read data of the multiple-layer optical disc in which the data recorded on a previous layer and a subsequent layer of the multiple-layer optical disc is read in an OTP manner, wherein the optical disc drive comprises: a pick-up module; and a microcomputer to control the pick-up module such that, when a start sector of the subsequent layer is located outward from a last sector of the previous layer, the pick-up module is moved to a position corresponding to the start sector of the subsequent layer continuously after completing the reading of the data recorded on the previous layer, and is made to perform a layer jump to the position corresponding to the start sector of the subsequent layer.

The optical disc drive may further include a memory to store information for controlling an overall operation of the optical disc drive, and data read during control of the microcomputer.

The microcomputer may store a horizontal distance between the last sector of the previous layer and the start sector of the subsequent layer in the memory after calculating the horizontal distance from data recorded on a lead-in area of the previous layer, and determine a traveling distance of the pick-up module with reference to the horizontal distance stored in the memory when further moving the pick-up module to the position corresponding to the start sector of the subsequent layer.

The microcomputer may calculate the horizontal distance before reading data recorded on the previous layer.

The horizontal distance may be a distance on a horizontal traveling path along which the pick-up module moves to reach the position corresponding to the start sector of the subsequent layer after reading the last sector of the previous layer.

The apparatus may further include a buffer in which the data read by the optical disc drive is sequentially stored, and the microcomputer may sequentially store data respectively read from the previous layer, a horizontal distance section, and the subsequent layer in the buffer.

The apparatus may further include a data processing device to receive and process the data transmitted from the buffer, the data processing device continuously reproducing only the data read from the previous layer and the subsequent layer excluding the data read from the horizontal distance section when reproducing the data stored in the buffer.

The data processing device may be an MPEG codec.

The data processing device may be a central processing unit of a computer.

The apparatus may further include a data communication interface provided between the buffer and the data processing device, and communicably connected with the buffer and the data processing device, the data communication interface transmitting only the data read from the previous layer and the subsequent layer, and excluding the data read from the horizontal distance section when transmitting the data stored in the buffer to the data processing device.

The data communication interface may be an ATAPI.

In accordance with another aspect of the present invention, a method for playing an optical disc in an OTP manner to read data recorded on a previous layer and a subsequent layer thereof, includes: controlling a pick-up module such that, when a start sector of the subsequent layer is located outward from a last sector of the previous layer, the pick-up module is moved a position corresponding to the start sector of the subsequent layer continuously after completing the reading of the data recorded on the previous layer, and is made to perform a layer jump to the position corresponding to the start sector of the subsequent layer.

The method may further include calculating a horizontal distance between the last sector of the previous layer and the start sector of the subsequent layer from data recorded on a lead-in area of the previous layer; and determining a traveling distance of the pick-up module with reference to the horizontal distance when the pick-up module is to be moved to the position corresponding to the start sector of the subsequent layer.

The horizontal distance may be calculated before reading the data recorded on the previous layer.

The horizontal distance may be a distance on a horizontal traveling path along which the pick-up module moves to reach a position corresponding to the start sector of the subsequent layer after reading the last sector of the previous layer while the multiple-layer optical disc rotates.

The method may further include sequentially storing data respectively read from the previous layer, a horizontal distance section, and the subsequent layer in a buffer; and continuously reproducing only the data read from the previous layer and the subsequent layer, and excluding the data read from the horizontal distance section when reproducing the data stored in the buffer.

In accordance with another aspect of the present invention, a method of reproducing data from an optical disc through an OTP method using an optical disc drive having a pick up module is provided, the optical disc having at least a first layer and a second layer formed above the first layer, the first layer having a lead-in area having a first data, the first and second layers each having respective data area containing respective second data and an outer area containing respective third data, the second layer having a lead-out area having a fourth data, the data area of the first layer having a last sector adjacent to the outer area of the first layer and the data area of the second layer having a first sector adjacent to the outer area of the second layer, wherein a first direction is substantially parallel to a radial direction of the first layer and a second direction is substantially perpendicular to the first direction, the method includes, reading the first data from the lead-in area of the first layer, reading the second data from the data area of the first layer while moving the pickup module in the first direction along the data area of the first layer, and moving the pickup module from a location corresponding to the last sector to a location corresponding to the first sector based on the first data read from the lead-in area of the first layer.

In accordance with an aspect of the present invention, an apparatus to reproduce data from an optical disc through an OTP method using an optical disc drive is provided, the optical disc having at least a first layer and a second layer formed above the first layer, the first layer having a lead-in area having a first data, the first and second layers each having respective data area containing respective second data and an outer area containing respective third data, the second layer having a lead-out area having a fourth data, the data area of the first layer having a last sector adjacent to the outer area of the first layer and the data area of the second layer having a first sector adjacent to the outer area of the second layer, wherein a first direction is substantially parallel to a radial direction of the first layer and a second direction is substantially perpendicular to the first direction, the optical disc drive includes, a pick up module, and a controller to control the pickup module to read the first data from the lead-in area of the first layer, read the second data from the data area of the first layer while moving the pickup module in the first direction along the data area of the first layer, and move the pickup module from a location corresponding to the last sector to a location corresponding to the first sector based on the first data read from the lead-in area of the first layer.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the various aspects of the present invention, taken in conjunction with the accompanying drawings, of which.

DETAILED DESCRIPTION OF THE EMBODIMENTS

Figure 1:
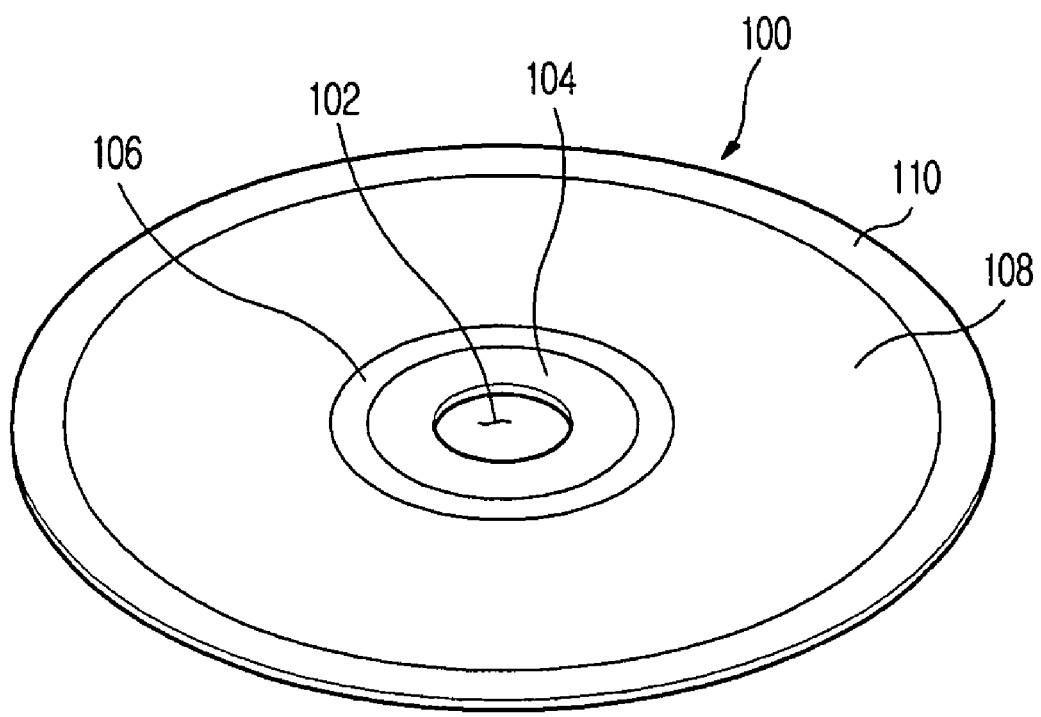
FIG. 1 is a perspective view illustrating a multiple-layer optical disc in accordance with an aspect of the present invention.

Reference will now be made in detail to the embodiments of the present invention, examples of which are illustrated in the accompanying drawings, wherein like reference numerals refer to the like elements throughout the drawings. The embodiments are described below in order to explain the present invention by referring to the figures.

The various aspects of the present invention will be described below to explain the present invention by referring to FIGS. 1 to 6. FIG. 1 is a perspective view illustrating a multiple-layer optical disc in accordance with an aspect of the present invention. As shown in FIG. 1, the multiple-layer optical disc denoted by reference numeral 100 has a clamping hole 102 formed at the center thereof, into which one end of a rotational shaft is inserted to rotate the multiple-layer optical disc 100 which is loaded in an optical disc drive.

The multiple-layer optical disc 100 also has a clamping portion 104 formed around the clamping hole 102 to secure the optical disc 100 when the multiple-layer optical disc 100 rotates in the optical disc drive. A lead-in area 106, a data area 108, and a lead-out area 110 are sequentially provided around the clamping portion 104 from an inner radial portion to an outer radial portion of the multiple-layer optical disc 100. In this regard, for an opposite track path (OTP) method wherein data reading is performed in opposite directions on adjacent layers, the lead-in area 106 and the lead-out area 110 are often placed in opposite locations according to the type of layer.

Information about disc and data are recorded on the lead-in area 106. The information about disc is information about the format of the multiple-layer optical disc 100, and includes information about classification of the optical disc 100 (for example, CD, DVD, BD, HD-DVD, etc.), information about layer (for example, single layer or multiple layer), information about optical power correction (OPC) for each layer, and the like. Representative information about data is a table of contents (TOC), which comprises information about construction and size of data, address information for each sector, and the like. In particular, it is possible to find an address of the start sector and an address of the last sector via the address information for each sector. In addition, contents (for example, video data, sound data, and program data) desired to be stored on the multiple-layer optical disc 100 are recorded and stored on the data area 108. The lead-out area 110 is positioned next to the data area 108, and indicates an end of the data area 108. In some cases, the information recorded on the lead-in area 106 is also recorded on the lead-out area 110.

Figure 2:
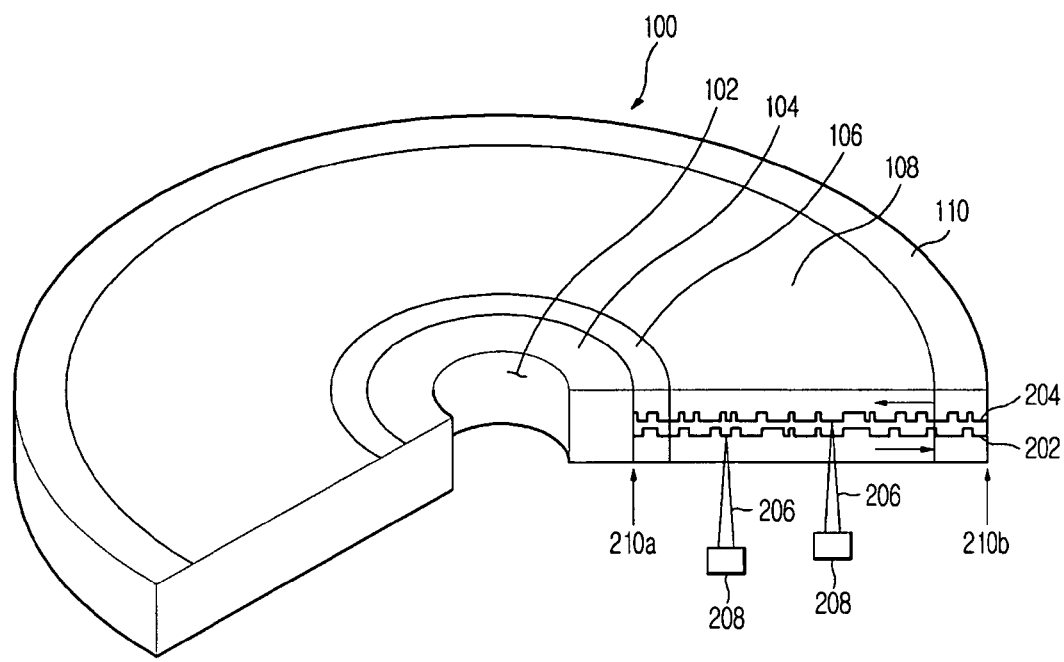
FIG. 2 is a partially cross-sectional view of the multiple-layer optical disc shown in FIG. 1.

FIG. 2 is a partial cross-sectional view of the multiple-layer optical disc shown in FIG. 1. As shown in FIG. 2, the multiple-layer optical disc 100 according to an aspect of the present invention comprises two layers 202 and 204 on which data is recorded. When reading the data recorded on a lower layer 202, a laser beam 206 is focused on the surface of the lower layer 202, and when reading the data recorded on an upper layer 204, the laser beam 206 is focused on the surface of the upper layer 204. In the case of the multiple-layer optical disc 100 shown in FIG. 2, data reading is performed at first on the lower layer 202, and then on the upper layer 204. Thus, according to such a data reading sequence, the lower layer 202 and the upper layer 204 will hereinafter be referred to as a previous layer or a first layer and a subsequent layer or a second layer, respectively.

Each of the previous layer 202 and the subsequent layer 204 is formed with a continuous helical track on which the data is recorded. In order to read the data from the respective layers, the laser beam 206 is focused on the track of the corresponding layer while moving a pick-up module 208. Meanwhile, although the tracks of the respective layers 202 and 204 have the helical shape, a traveling locus of the pick-up module 208 becomes not helical, but linear upon data reading. The reason is that the pick-up module 208 performs a focusing operation along the continuous track while traveling linearly in a direction from an inner radial portion 210a to an outer radial portion 210b of the multiple-layer optical disc 100 or vice versa rather than traveling circularly along the track, due to the rotation of the multiple-layer optical disc 100 during the data reading.

For the multiple-layer optical disc 100 according to an aspect of the invention, the data reading of the respective layers 202 and 204 is performed in the OPT manner. In other words, when reading the data recorded on the previous layer 202, the pick-up module 208 also moves in an axial direction from the inner radial portion 210a to the outer radial portion 210b of the multiple-layer optical disc 100, and when reading the data recorded on the subsequent layer 204, the pick-up module 208 moves in the direction from the outer radial portion 210b to the inner radial portion 210a of the multiple-layer optical disc 100. That is, when continuously reading the data recorded on the previous layer 202 and the subsequent layer 204, the pick-up module 208 moves from the inner radial portion 210a to the outer radial portion 210b while reading the data recorded on the previous layer 202, and then moves from the outer radial portion 210b to the inner radial portion 210a while reading the data recorded on the subsequent layer 204.

Hereinafter, movement of the pick-up module 208 between the inner radial portion 210a and the outer radial portion 210b in parallel to a recording surface of the multiple-layer optical disc 100 will be defined as a horizontal (or radial) movement of the pick-up module 208, and movement (or jump) of the pick-up module 208 in a direction from the previous layer 202 to the subsequent layer 204 or vice versa will be defined as a vertical movement (or a perpendicular movement relative to the radial movement) of the pick-up module 208. In discussing the aspects of the present invention, it is understood that pick-up module 208 need not physically move between the inner radial portion 210a and the outer radial portion 210b within the multiple-layer optical disc 100. Rather, movements of the pick-up module 208 between the inner radial portion 210a and the outer radial portion 210b, as well as other described movements, are representations of the physical movements occurring to the pick-up module 208 and/or the focusing operation of the pick-up module 208.

Figure 3:
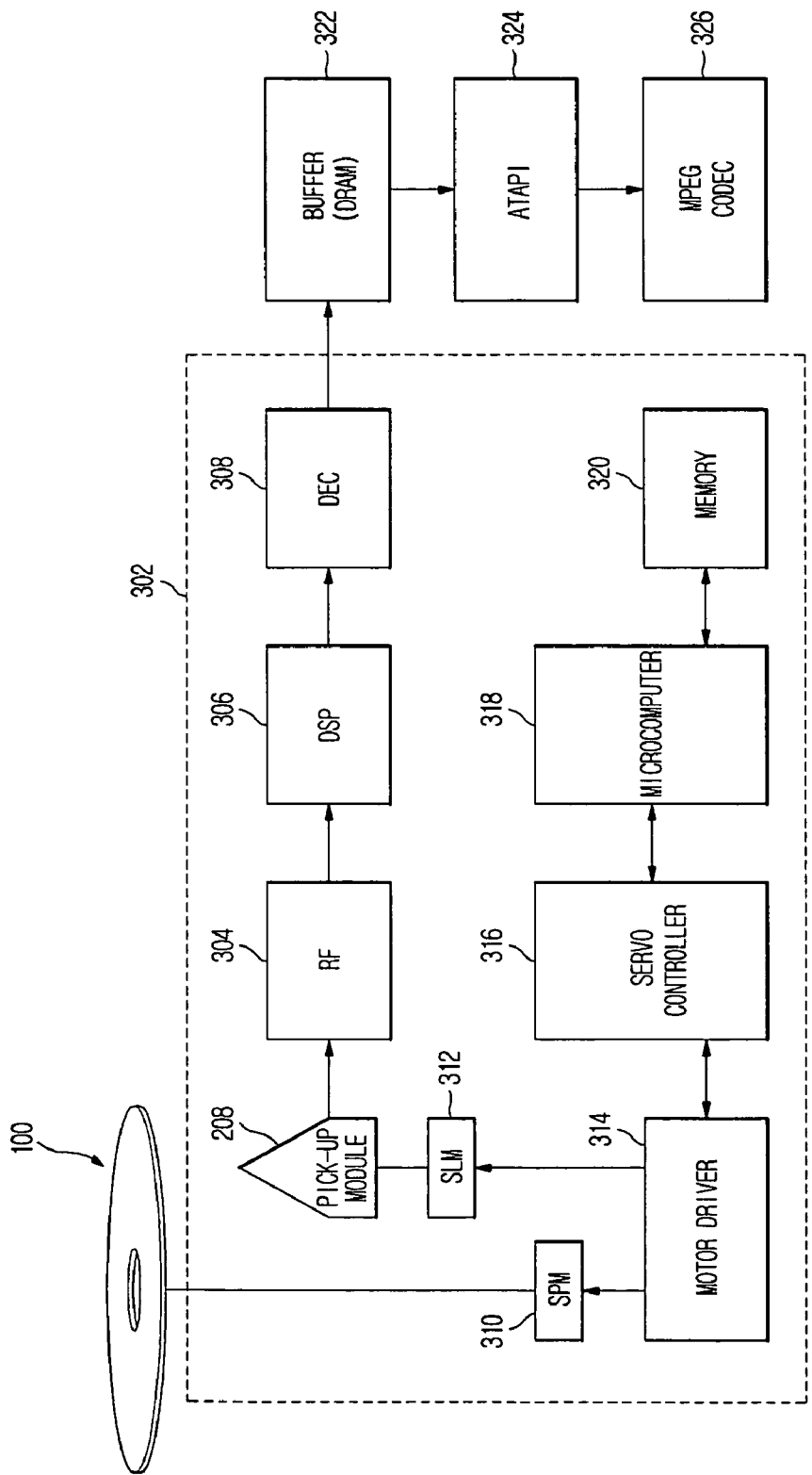
FIG. 3 is a block diagram illustrating an apparatus for playing an optical disc in accordance with an aspect of the present invention.

FIG. 3 is a block diagram illustrating an apparatus for playing an optical disc in accordance with one aspect of the present invention. In FIG. 3, a dotted block designated by reference numeral 302 is an optical disc drive positioned within the apparatus for playing the optical disc. A buffer 322, an advanced technology attachment packet Interface (ATAPI) 324, and an MPEG codec 326 are also provided independent of the optical disc drive within the apparatus for playing the optical disc. The ATAPI 324 is one of representative data communication interfaces between the optical disc drive and a code chip. It is understood that the buffer 322, the advanced technology attachment packet Interface (ATAPI) 324, and the MPEG codec 326 may also be provided together with the optical disc drive 302, and may be integrated. It is understood that the buffer 322, the advanced technology attachment packet Interface (ATAPI) 324, and the MPEG codec 326 may be provided as a single device or may be implemented as software and/or firmware for use with one or more processors.

In the optical disc drive 302, the data read by the pick-up module 208 is transmitted in the form of an RF (Radio Frequency) signal to an RF signal processor 304, which amplifies the RF signal, and then converts the amplified RF signal into a binary signal. After being converted by the RF signal processor 304, the binary signal is restored into a digital data by a digital signal processor 306. Since the restored digital data is an encoded signal, it is necessary to decode the encoded digital data into a decoded digital data existing before being encoded. A spindle motor 310 serves to rotate the multiple-layer optical disc 100 at a high speed, and a sled motor 312 serves to move the pick-up module 208. The spindle motor 310 and the sled motor 312 are controlled by a control system constituted of a microcomputer 318, a servo controller 316, and a motor driver 314. Specifically, the microcomputer 318 controls an overall operation of the optical disc drive 302, and comprises a memory 320, which stores information related to control of the overall operation of the optical disc drive 302 or data created during control thereof.

The digital data decoded by the decoder 308 of the optical disc drive 302 is sequentially stored in a buffer 322. The buffer 322 serves to temporarily store the data obtained via the optical disc drive 302 before transmitting it to the MPEG codec 326, and can be realized by a volatile memory such as a DRAM. After being stored in the buffer 322, the data is transmitted to the MPEG codec 326 via the ATAPI 324. The MPEG codec 326 is a data processor for reproducing the video data. If the contents desired to reproduce are video contents, the MPEG codec 326 reproduces a video signal and a sound signal from digital video data and digital audio data compressed in an MPEG format. In the case where the present invention is applied to a personal computer (PC) comprising the optical disc drive, a central process unit (CPU) of the PC acts as the MPEG codec 326. It is understood that the buffer 322 may also be implemented as non volatile memory such as a hard disc drive, and the MPEG codec 326 may be software and/or firmware for use with one or more processors, or stored in a storage medium.

Figure 4:
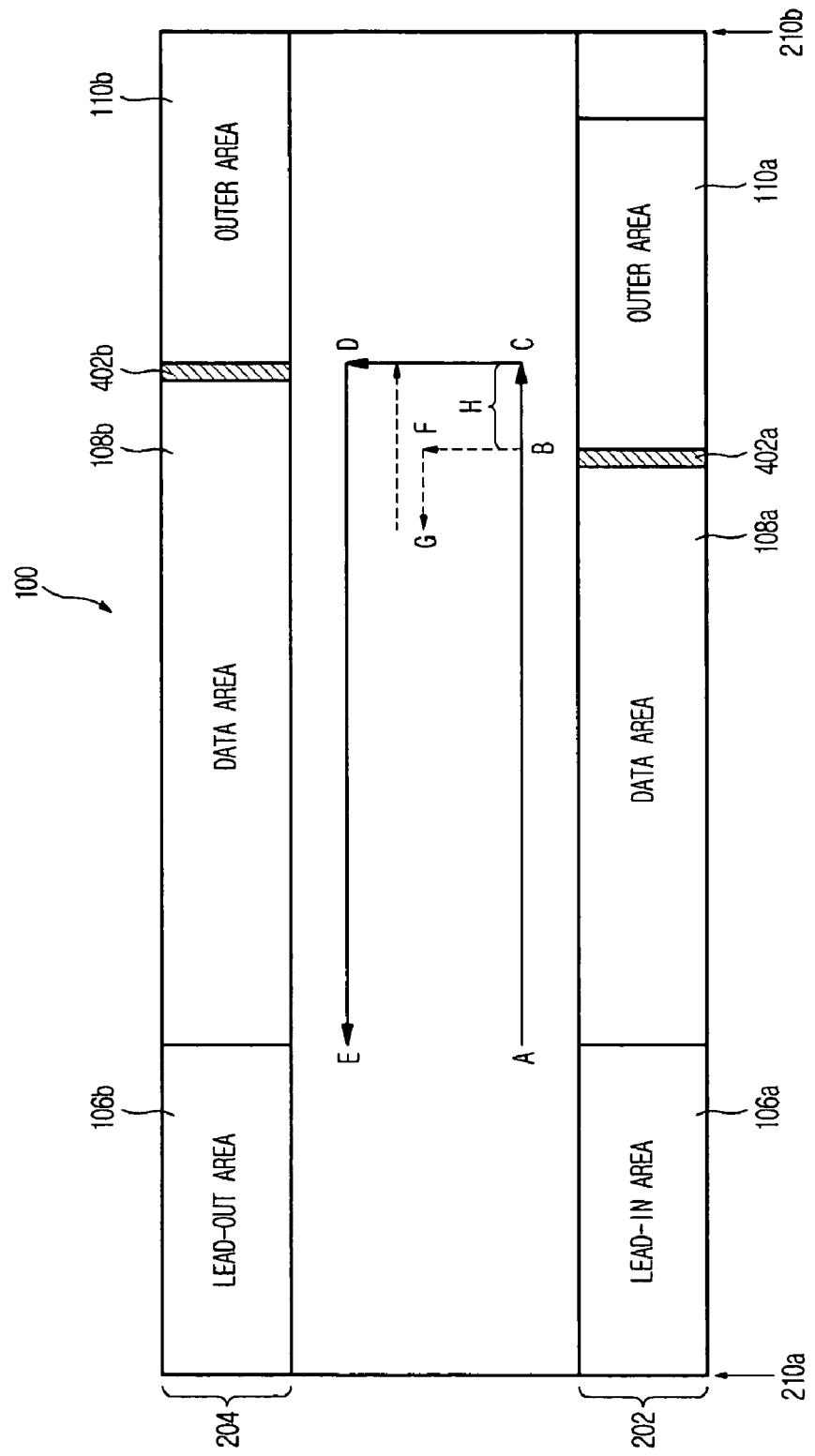
FIG. 4 is a diagram illustrating a traveling path of a pick-up module during reading data recorded on the multiple-layer optical disc in accordance with an aspect of the present invention.

FIG. 4 is a diagram illustrating a traveling path representation of the pick-up module during reading of the data recorded on the multiple-layer optical disc in accordance with an aspect of the present invention. As shown in FIG. 4, the previous layer 202 has a lead-in area 106a, a data area 108a, and a lead-out area 110a sequentially formed in a direction from the inner radial portion 210a to the outer radial portion 210b, and the subsequent layer 204 has an outer area 110b, a data area 108b, and a lead-out area 106b sequentially formed in a direction from the outer radial portion 210b to the inner radial portion 210a.

In FIG. 4, solid arrows indicate traveling path and traveling direction representations of the pick-up module 208 according to an aspect of the present invention between the previous layer 202 and the subsequent layer 204. As shown in FIG. 4, the pick-up module 208 reads the data recorded on the previous layer 202 while traveling horizontally or radially towards the outer radial portion 210b from Point A where the data area 108a of the previous layer 202 starts. When the pick-up module 208 arrives at a location or a position corresponding to Point B, the data reading on the previous layer 202 is completed. However, the pick-up module 208 does not need to stop at the Point B, but continuously travels to Point C with or without changing current traveling speed and direction. The Point C is located immediately below the first sector of the data area 108b on the subsequent layer 204, that is, a start sector 402b.

In FIG. 4, a horizontal distance H between the Point B and the Point C is a distance on the horizontal traveling path required for the pick-up module 208 to move in order to read (or to reach a position corresponding to) the start sector 402b of the subsequent layer 204 after reading the last sector 402b of the previous layer 202 on the rotating multiple-layer optical disc 100. The horizontal distance H is generated because the effective data area 108a of the previous layer 202 having effective data recorded thereon has a smaller radius than the effective data area 108b of the subsequent layer 204. Such a difference in radius of the effective data areas between the two layers 202 and 204 is caused by the fact that an amount of the data recorded on the previous layer 202 is smaller than that of the data recorded on the subsequent layer 204. Preferably, such a horizontal distance H is obtained via information recorded on the lead-in area 106a at an initial data reading stage of the optical disc 100. For this purpose, it is desirable that the microcomputer 318 of the optical disc drive 302 have a control algorithm used for obtaining the horizontal distance H. It is understood that the effective data area 108a of the previous layer 202 having effective data recorded thereon may also have a larger radius than the effective data area 108b of the subsequent layer 204. Such a difference in radius of the effective data areas between the two layers 202 and 204 is caused by the fact that an amount of the data recorded on the previous layer 202 is greater than that of the data recorded on the subsequent layer 204. Additionally, in one aspect of the present invention, the horizontal distance H is simply prerecorded in the lead-in area 106a and/or any other area so that the horizontal distance H is simply obtained. In another aspect of the present invention, the horizontal distance H may be calculated based on the amount of data recorded in the previous layer 202 and the subsequent layer 204. In the latter case, the control algorithm may be used to calculate the horizontal distance H based on the difference in the amount of data recorded in the previous layer 202 and the subsequent layer 204.

After traveling an A-C section without stopping, the pick-up module 208 jumps to the subsequent layer 204 in order to read the data recorded on the subsequent layer 204. During the jump, the pick-up module 208 may move vertically from the Point C to Point D if necessary, or an objective lens may move vertically with the pick-up module 208 stationary. After jumping to the subsequent layer 204, the pick-up module 208 performs the data reading while continuously traveling horizontally from the Point D to Point E. That is, when viewing a traveling path of the pick-up module 208 which reads the data recorded on the previous layer 202 and the subsequent layer 204, it can be appreciated that the pick-up module 208 travels horizontally on the A-C section without stopping, jumps to the subsequent layer 204 in a C-D section, and travels horizontally on a D-E section without stopping. It is understood that the horizontal movement of the pick-up module 208 is in the radial direction of the optical disc 100 and the vertical movement or the jump is in a perpendicular direction to the radial direction. It is understood that the horizontal movement of the pick-up module 208 may occur sequentially or simultaneously with the vertical movement of the pick-up module 208, and vice versa.

When the pick-up module 208 stops at the Point B as indicated by a dotted arrow in FIG. 4 after traveling from the Point A to the Point B, and then attempts to perform focusing on the subsequent layer 204, it is then preferred, but not required, to confirm a current position (sector) of the pick-up module 208 relative to the subsequent layer 204 after the pick-up module 208 moves vertically to Point F and performs focusing on the subsequent layer 204. During a period of time to confirm the current position (sector) of the pick-up module 208 at the Point F on the subsequent layer 204, the pick-up module 208 travels along the track in a direction of Point G which is a direction of reading the data on the subsequent layer 204. In confirming the current position of the pick-up module 208 while traveling from the Point F to the Point G, if it is determined that the current position of the pick-up module 208 is not in the start sector 402b of the subsequent layer 204, it is necessary for the pick-up module 208 to find the start sector 402b of the subsequent layer 204 while moving from the Point G towards the outer radial portion 210b. When searching for the start sector 402b of the subsequent layer 204, the pick-up module 208 may perform the data reading on the subsequent layer 204 while traveling from the Point D towards the Point E.

As such, according to an aspect of the present invention indicated by a solid arrow, the pick-up module 208 travels horizontally on the A-C section without stopping, performs focusing while confirming its current position in the C-D section on the subsequent layer 204, and then travels on the D-E section. On the other hand, according to another aspect of the present invention indicated by the dotted arrow, the pick-up module 208 stops at the Point B and performs focusing and confirmation of current position on the subsequent layer 204. In this regard, during operation of focusing and confirming the current position, there may occur additional traveling (F-G section) of the pick-up module 208, and a time delay caused thereby. Such additional travel is minimized when a destination of the pick-up module 208 is determined prior to the various movements of the pick-up module 208.

Figure 5:
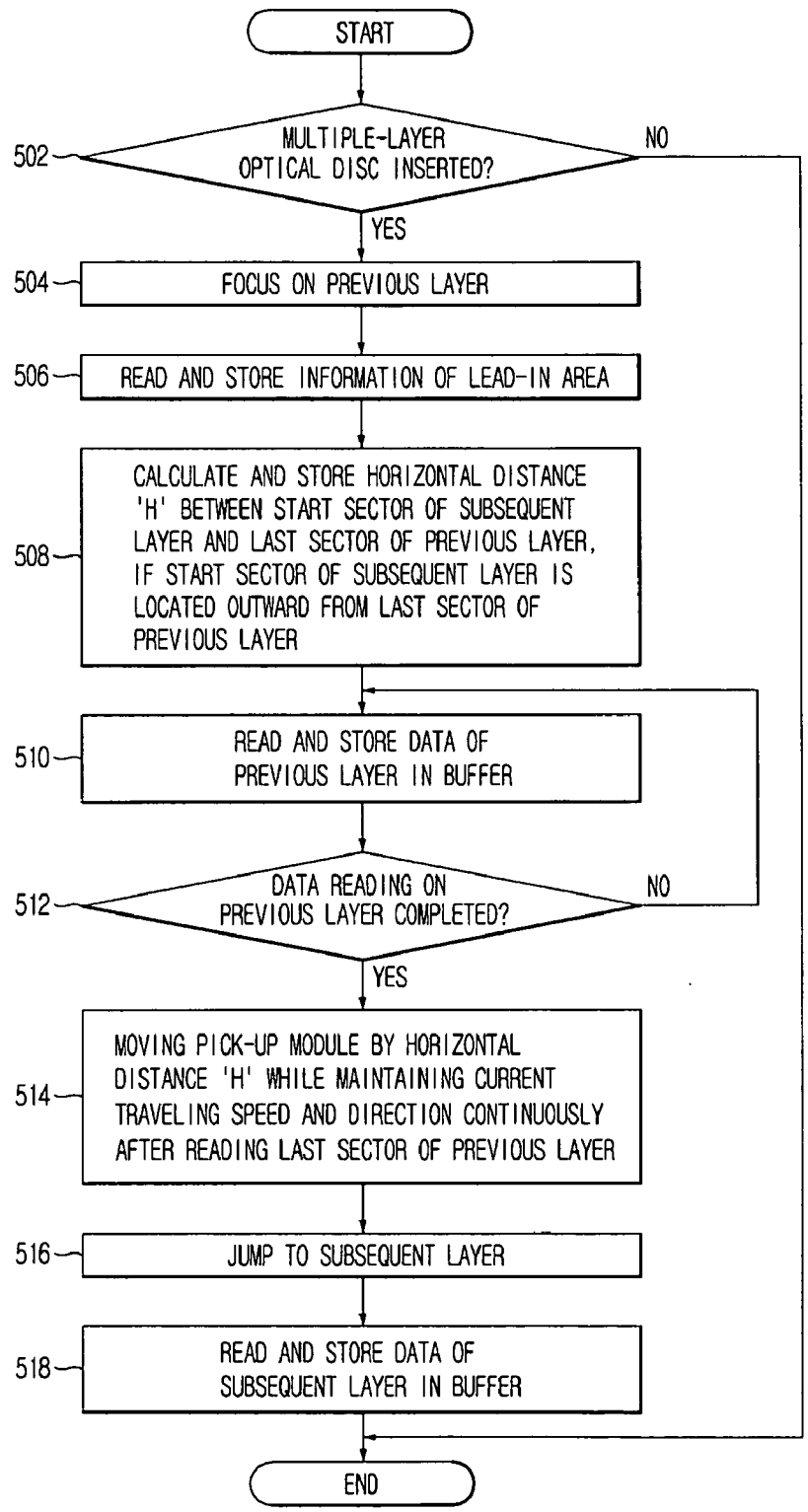
FIG. 5 is a sequential diagram illustrating a method of controlling data reading on the multiple-layer optical disc in accordance with an aspect of the present invention.

FIG. 5 is a diagram illustrating a reading and control method of the multiple-layer optical disc according to an aspect of the present invention. As shown in FIG. 5, the microcomputer 318 of the optical disc drive 302 confirms whether the multiple-layer optical disc 100 is inserted into the optical disc drive 302 (operation 502). If it is determined that the multiple-layer optical disc 100 is inserted thereinto, the microcomputer 318 drives the spindle motor 310 to cause the multiple-layer optical disc 100 inserted into the optical disc drive 302 to rotate at a high speed, and drives the sled motor 312 to cause the pick-up module 208 to travel and perform focusing on the previous layer 202 of the multiple-layer optical disc 100 (operation 504).

The microcomputer 318 reads and stores optical disc classification information, layer information, OPC information, TOC information, and the like recorded on the lead-in area 106a of the previous layer 202 in the memory 320 (operation 506). If the start sector 402b of the subsequent layer 204 is located radially outward from the last sector 402a of the previous layer 202, and if this information is read by the microcomputer 318 as distance H, the microcomputer 318 calculates and stores the horizontal distance H between the start sector 402b of the subsequent layer 204 and the last sector 402a of the previous layer 202 in the memory 320 (operation 508).

After calculating and storing the horizontal distance H, the microcomputer 318 controls the optical disc drive 302 such that data recorded on the previous layer 202 can be read, and stored in the buffer 322 (operation 510). Then, even if is determined that data reading on the previous layer 202 is completed (Yes in operation 512) as the pick-up module is moved in a horizontal direction, the microcomputer 318 does not allow the pick-up module 208 to stop at the end of the last sector 402a of the previous layer 202, but allows the pick-up module 208 to travel to a position corresponding to the start sector 402b of the subsequent layer 204 by moving the pick-up module 208 by the horizontal distance H stored in the memory 320 without stopping while maintaining current traveling speed and direction (operation 514). That is, the microcomputer 318 allows the pick-up module 208 to travel from the Point A to the Point C shown in FIG. 4 without stopping while maintaining the traveling speed and direction of the pick-up module 208 provided when reading the data area of the previous layer 202.

After moving the pick-up module 208 to the position corresponding to the start sector 402b of the subsequent layer 204, the microcomputer 318 controls the sled motor 312 and the pick-up module 208 to focus on the subsequent layer 204 (516). After focusing on the subsequent layer 204, the microcomputer 318 controls the optical disc drive 302 such that data recorded on the data area 106b of the subsequent layer 204 can be read, and stored in the buffer 322 (operation 518).

With the control process as shown in FIG. 5, the data recorded on the data area 108a of the previous layer 202, and the data recorded on the data area 108b of the subsequent layer 204 is read, and stored in the buffer 322. However, dummy data (or data without meaning) read from the disc 100 related to the horizontal distance H of FIG. 4, that is, in the B-C section, is also stored in the buffer 322. In this regard, if the dummy data is also transmitted to, and reproduced by the MPEG codec 326, it disturbs natural play of video. Accordingly, it is necessary to provide a measure to prevent this disturbance.

In an aspect of the present invention, the dummy data may simply not be read from the disc 100 related to the horizontal distance H when the pick-up module 208 traverses an area determined to have the dummy data based on the horizontal distance H. In another aspect of the present invention, the dummy data may simply not be stored in the buffer 322 when the pick-up module 208 traverses an area determined to have the dummy data based on the horizontal distance H.

Figure 6:
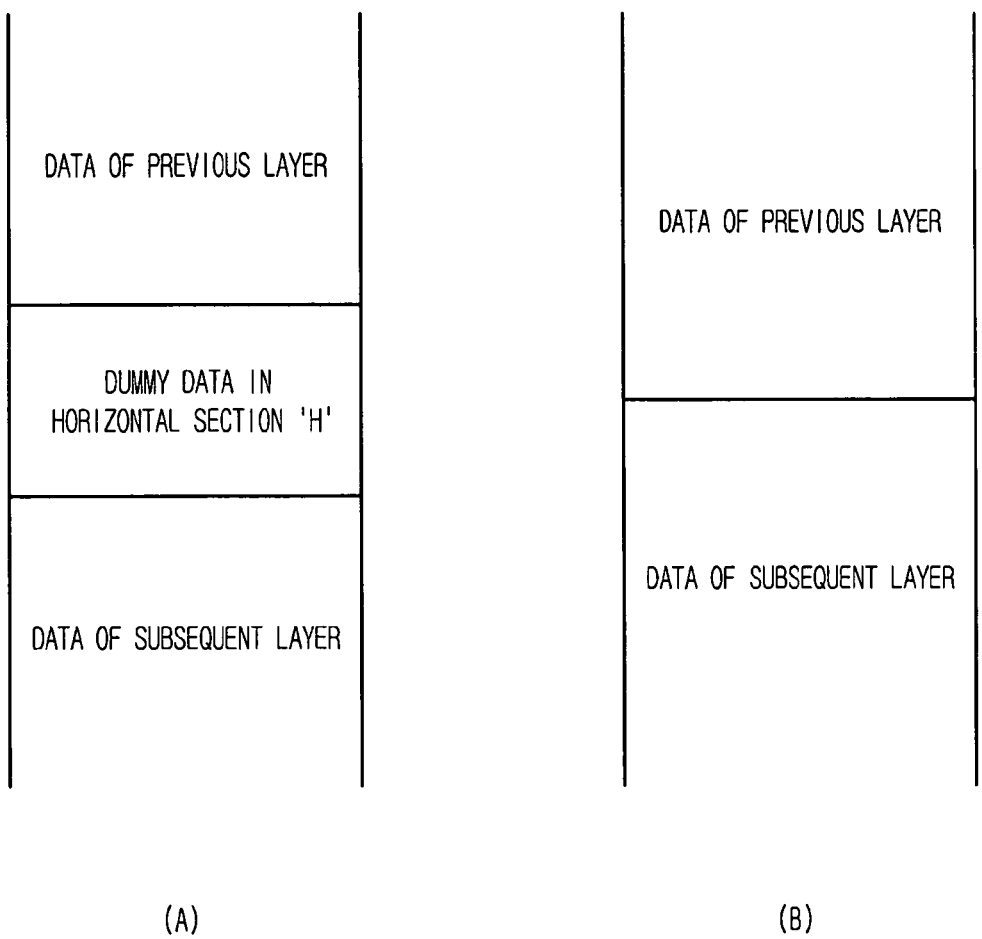
FIG. 6 is a diagram illustrating data read and stored in a buffer by the method of controlling data reading on the multiple-layer optical disc in accordance with an aspect of the present invention shown in FIG. 5, and data transmitted to an MPEG codec in practice.

FIG. 6 is a diagram illustrating data stored in a buffer by the method of controlling data reading on the multiple-layer optical disc shown in FIG. 5, and data transmitted to an MPEG codec in practice. As shown in Part A of FIG. 6, the data read from the data area 108a of the previous layer 202, the dummy data read from the horizontal distance H section, and the data read from the data area 108b of the subsequent layer 204 are stored in the buffer 322. If the dummy data stored in the buffer 322 is directly transmitted to the MPEG codec 326, and reproduced via a display device, a meaningless section of video can be inserted between a video obtained by reproducing the data of the previous layer 202 and a video obtained by reproducing the data of the subsequent layer 204, thereby failing to smoothly play the stored video, for example by not being able to reproduce any videos, or other wanted data, or reproducing only static or unwanted data. In this regard, an interface protocol is provided such that the ATAPI 324 provided between the buffer 322 and the MPEG codec 326 allows only the data of the previous layer 202 and the data of the subsequent layer 204 excluding the dummy data to be transmitted from the buffer 322 to the MPEG codec 326 when the data stored in the buffer 322 is transmitted to the MPEG codec 326. This allows the video obtained by reproducing the data of the previous layer 202 and the video obtained by reproducing the data of the subsequent layer 204 to be naturally connected without noticeable gaps (as represented in Part B in FIG. 6). It is understood that exclusion of the dummy data may be implemented by software and/or firmware for use with one or more processors.

As apparent from the above description, according to an aspect of the present invention, when playing the multiple-layer optical disc having two or more layers, the pick-up module has a shortened traveling path upon layer jump, so that a more rapid layer jump of the pick-up module can be realized. In addition, when playing the multiple-layer optical disc having the two or more layers, the pick-up module has a shortened period of time required to move upon the layer jump, so that more rapid layer jump of the pick-up module can be realized.

Such a more rapid layer jump of the pick-up module enables continuous data processing in reading and reproducing data of the previous layer and the subsequent layer, thereby allowing continuous natural reproduction of video and sound data.

Furthermore, according to the present invention, since the pick-up module has a significantly shortened period of time required for the layer jump, there can be more leeway in operation of the buffer, thereby providing improved advantages in system design and cost reduction, in comparison to the case where a relatively long period of time is required for the layer jump, which results in a buffer having a large capacity due to necessity of securing a sufficient amount of data in the buffer in consideration of the relatively long period of time for the layer jump.

Although a few embodiments of the present invention have been shown and described, it would be appreciated by those skilled in the art that various modifications, additions and substitutions may be made in these embodiments without departing from the principle and spirit of the invention, the scope of which is defined in the claims and their equivalents.

What is claimed is:

1. An apparatus for playing a multiple-layer optical disc, comprising an optical disc drive to read data of the multiple-layer optical disc, in which the data recorded on a previous layer and a subsequent layer of the multiple-layer optical disc is read in an OTP manner, wherein the optical disc drive comprises:

a pick-up module; and a microcomputer to control the pick-up module such that, when a start sector at the beginning of an effective data area of the subsequent layer is located outward from a last sector of the previous layer, the pick-up module is moved to a position corresponding to the start sector at the beginning of the effective data area of the subsequent layer continuously after completing the reading of the data recorded on the previous layer, and is made to perform a layer jump to the position corresponding to the start sector at the beginning of the effective data area of the subsequent layer.

2. The apparatus according to claim 1, wherein the optical disc drive further comprises a memory to store information for controlling an overall operation of the optical disc drive, and data read during control of the microcomputer.

3. The apparatus according to claim 2, wherein the microcomputer stores a horizontal distance between the last sector of the previous layer and the start sector of the subsequent layer in the memory after calculating the horizontal distance from data recorded on a lead-in area of the previous layer, and determines a traveling distance of the pick-up module with reference to the horizontal distance stored in the memory when further moving the pick-up module to the position corresponding to the start sector of the subsequent layer.

4. The apparatus according to claim 3, wherein the microcomputer calculates the horizontal distance before reading the data recorded on the previous layer.

5. The apparatus according to claim 4, wherein the horizontal distance is a distance on a horizontal traveling path along which the pick-up module moves to reach the position corresponding to the start sector of the subsequent layer after reading the last sector of the previous layer.

6. The apparatus according to claim 3, further comprising a buffer to sequentially store data read via the optical disc drive, when the microcomputer sequentially stores data respectively read from the previous layer, a horizontal distance section, and the subsequent layer in the buffer.

7. The apparatus according to claim 6, further comprising:

a data processing device to receive and process the data transmitted from the buffer, the data processing device continuously reproducing only the data read from the previous layer and the subsequent layer and excluding the data read from the horizontal distance section when reproducing the data stored in the buffer.

8. The apparatus according to claim 7, wherein the data processing device is an MPEG codec.

9. The apparatus according to claim 7, wherein the data processing device is a central processing unit of a computer.

10. The apparatus according to claim 6, further comprising:

a data communication interface provided between the buffer and the data processing device, and communicably connected with the buffer and the data processing device, the data communication interface transmitting only the data read from the previous layer and the subsequent layer, and excluding the data read from the horizontal distance section when transmitting the data stored in the buffer to the data processing device.

11. The apparatus according to claim 10, wherein the data communication interface is an ATAPI interface.

12. The apparatus according to claim 1, wherein the effective data area is a data area including video data, sound data, and program data recorded thereon.

13. The apparatus according to claim 1, wherein the effective data area is a data area not including dummy data.

14. A method for playing an optical disc in an OTP manner to read data recorded on a previous layer and a subsequent layer thereof, comprising:

controlling a pick-up module such that, when a start sector at the beginning of an effective data area of the subsequent layer is located outward from a last sector of the previous layer, the pick-up module is moved to a position corresponding to the start sector at the beginning of the effective data area of the subsequent layer continuously after completing the reading of the data recorded on the previous layer, and is made to perform a layer jump to the position corresponding to the start sector at the beginning of the effective data area of the subsequent layer.

15. The method according to claim 14, further comprising:

calculating a horizontal distance between the last sector of the previous layer and the start sector of the subsequent layer from data recorded on a lead-in area of the previous layer; and determining a traveling distance of the pick-up module with reference to the horizontal distance when the pick-up module is to be moved to the position corresponding to the start sector of the subsequent layer.

16. The method according to claim 15, wherein the horizontal distance is calculated before reading the data recorded on the previous layer.

17. The method according to claim 16, wherein the horizontal distance is a distance on a horizontal traveling path along which the pick-up module moves to reach a position corresponding to the start sector of the subsequent layer after reading the last sector of the previous layer.

18. The method according to claim 15, further comprising:

sequentially storing data respectively read from the previous layer, a horizontal distance section, and the subsequent layer in a buffer; and continuously reproducing only the data read from the previous layer and the subsequent layer, and excluding the data read from the horizontal distance section when reproducing the data stored in the buffer.

19. A method of reproducing data from an optical disc through an OTP method using an optical disc drive having a pick up module, the optical disc having at least a first layer and a second layer formed above the first layer, the first layer having a lead-in area having a first data, the first and second layers each having respective data areas containing respective second data and an outer areas containing respective third data, the second layer having a lead-out area having a fourth data, the data area of the first layer having a last sector adjacent to the outer area of the first layer and the data area of the second layer having a first sector adjacent to the outer area of the second layer, wherein a first direction is substantially parallel to a radial direction of the first layer and a second direction is substantially perpendicular to the first direction, the method comprising:

reading the first data from the lead-in area of the first layer;

reading the second data from the data area of the first layer while moving the pickup module in the first direction along the data area of the first layer; and moving the pickup module from a location corresponding to the last sector to a location corresponding to the first sector based on the first data read from the lead-in area of the first layer;

wherein the first sector is located radially further outward on the optical disc than the last sector and the first sector is positioned at the beginning of the data area of the second layer including video data, sound data, and program data.

20. The method of claim 19, further comprising moving the pick up module in the second direction from the location corresponding to the last sector to the location corresponding to the first sector based on the first data read from the lead-in area of the first layer.

21. The method of claim 19, wherein a difference in distance between the last sector and the first sector in the first direction is H, which is the first data read from the lead-in area of the first layer, and the pickup module is moved by H.

22. The method of claim 19, wherein a difference in distance between the last sector and the first sector in the first direction is H, which is calculated based on the amount of the second data of the first layer and the amount of the second data of the second layer, and wherein the respective amounts of the second data of the first and second layers are obtained from the first data, and wherein the pickup module is moved by H.

23. The method of claim 19, further comprising reading the third data of the first layer while moving the pickup module in the first direction from the location corresponding to the last sector to the location corresponding to the first sector.

24. The method of claim 23, further comprising:
    recording the second data and the third data of the first layer, and the second data of the second layer, on a medium; and
    reproducing only the respective second data of the first and second layers.

25. The method of claim 19, further comprising not reading the third data of the first layer while moving the pickup module from the location corresponding to the last sector to the location corresponding to the first sector.

26. The method of claim 20, wherein the moving in the first and second directions is done concurrently.

27. The method of claim 19, wherein the data area of the second layer does not include dummy data.

28. An apparatus to reproduce data from an optical disc through an OTP method using an optical disc drive, the optical disc having at least a first layer and a second layer formed above the first layer, the first layer having a lead-in area having a first data, the first and second layers each having respective data areas containing respective second data and an outer area containing respective third data, the second layer having a lead-out area having a fourth data, the data area of the first layer having a last sector adjacent to the outer area of the first layer and the data area of the second layer having a first sector adjacent to the outer area of the second layer, wherein a first direction is substantially parallel to a radial direction of the first layer and a second direction is substantially perpendicular to the first direction, the optical disc drive comprising:
    a pick up module; and
    a controller to control the pickup module to read the first data from the lead-in area of the first layer, read the second data from the data area of the first layer while moving the pickup module in the first direction along the data area of the first layer, and move the pickup module from a location corresponding to the last sector to a location corresponding to the first sector based on the first data read from the lead-in area of the first layer;
    wherein the first sector is located radially further outward on the optical disc than the last sector and the first sector is positioned at the beginning of the data area of the second layer including video data, sound data, and program data.

29. The apparatus of claim 28, wherein the controller further moves the pick up module in the second direction from the location corresponding to the last sector to the location corresponding to the first sector based on the first data read from the lead-in area of the first layer.

30. The apparatus of claim 28, wherein a difference in distance between the last sector and the first sector in the first direction is H, which is the first data read from the lead-in area of the first layer, and the pickup module is moved by H.

31. The apparatus of claim 28, wherein a difference in distance between the last sector and the first sector in the first direction is H, which is calculated based on the amount of the second data of the first layer and the amount of the second data of the second layer, and wherein the respective amounts of the second data of the first and second layers are obtained from the first data, and wherein the pickup module is moved by H.

32. The apparatus of claim 28, a difference in distance between the last sector and the first sector in the first direction is H, which is from a radius associated with the second data of the first layer and a radius associated with the second data of the second layer, and wherein the respective radiuses are obtained from the first data, and wherein the pickup module is moved by H.

33. The apparatus of claim 28, wherein the controller further controls the pick up module to read the third data of the first layer while moving the pickup module in the first direction from the location corresponding to the last sector to the location corresponding to the first sector.

34. The apparatus of claim 33, further comprising a medium, wherein the controller controls the recording of the second data and the third data of the first layer, and the second data of the second layer, on the medium, and reproduces only the respective second data of the first and second layers.

35. The apparatus of claim 29, wherein the controller controls the pickup module to not read the third data of the first layer while moving the pickup module from the location corresponding to the last sector to the location corresponding to the first sector.

36. The apparatus of claim 29, wherein the controller controls the pickup module wherein the moving in the first and second directions is done concurrently.

37. A computer readable medium encoded with instructions for performing a method for playing an optical disc in an OTP manner to read data recorded on a previous layer and a subsequent layer thereof, the method comprising:
    controlling a pick-up module such that, when a start sector at the beginning of an effective data area of the subsequent layer is located outward from a last sector of the previous layer, the pick-up module is moved to a position corresponding to the start sector at the beginning of the effective data area of the subsequent layer continuously after completing the reading of the data recorded on the previous layer, and is made to perform a layer jump to the position corresponding to the start sector at the beginning of the effective data area of the subsequent layer.

38. The medium of claim 37, wherein the method further comprising further comprising:
    calculating a horizontal distance between the last sector of the previous layer and the start sector of the subsequent layer from data recorded on a lead-in area of the previous layer; and
    determining a traveling distance of the pick-up module with reference to the horizontal distance when the pick-up module is to be moved to the position corresponding to the start sector of the subsequent layer.

* * * * *